United States Patent [19]

Tozier

[11] Patent Number: 5,009,730
[45] Date of Patent: Apr. 23, 1991

[54] SYSTEM OF RESTORING ROUGH TOOL HANDLES

[76] Inventor: Michel C. Tozier, P.O. Box 858, Durham, Calif. 95938

[21] Appl. No.: 416,036

[22] Filed: Oct. 2, 1989

Related U.S. Application Data

[63] Continuation-in-part of Ser. No. 279,970, Dec. 5, 1988, abandoned.

[51] Int. Cl.⁵ .................................................. B32B 31/26
[52] U.S. Cl. ........................................ 156/85; 156/86; 264/230; 264/342 R
[58] Field of Search ............................... 156/84, 85, 86; 264/230, 342 R; 273/72 R, 75, 78, 81 R, 81 D; 16/110 R; 428/14, 34.9, 36.1, 913; 206/497, 575; 174/DIG. 8

[56] References Cited

U.S. PATENT DOCUMENTS

| | | | |
|---|---|---|---|
| 1,917,185 | 7/1933 | Sypher | 264/342 R |
| 1,998,356 | 4/1935 | Brown | 264/230 |
| 2,774,993 | 12/1956 | Hagen et al. | 156/86 |
| 3,313,017 | 4/1967 | Zingali | 264/230 |
| 3,568,308 | 3/1971 | Plaskon | 156/86 |
| 3,716,433 | 2/1973 | Plummer | 156/85 |
| 3,957,382 | 5/1976 | Greuel et al. | 156/86 |
| 4,632,790 | 12/1986 | Bernard | 264/342 R |
| 4,644,630 | 2/1987 | Blum | 156/86 |

OTHER PUBLICATIONS

"Shrink Tubing", Popular Science, p. 134, Jan. 1981.
"Shrinkable Tubing", Alphlex Shrinkable Tubing, Alpha Wire Corporation, Jun. 1961.

Primary Examiner—Caleb Weston

[57] ABSTRACT

An uncomplicated system of restoring a smoother, non-slip, splinter free gripping surface to a rough tool handle. Thin walled, heat shrinkable tubing is fitted over the rough handle and heated with a common "gun" style household hand-held hair dryer with an auxiliary air concentration nozzle to reduce the diameter of the tubing. The tubing recovers sufficiently to adhere to the outer diameter of the handle. The irregularities of the crevices and bumps on the rough handle present recessions into which the tubing conforms. Due to the thin walled nature of the tubing, the irregularities extend into the wall of the recovered tubing creating a more secure attachment of the tubing to the rough handle and furnishing a comfortable, somewhat textured, splinter free gripping surface for the user.

8 Claims, 3 Drawing Sheets

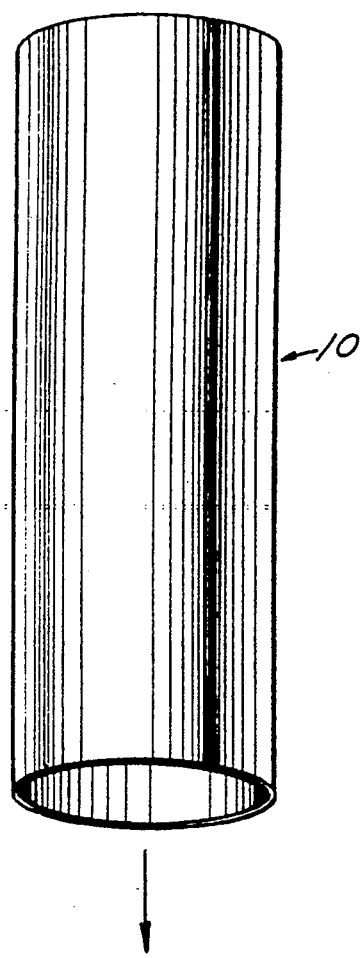
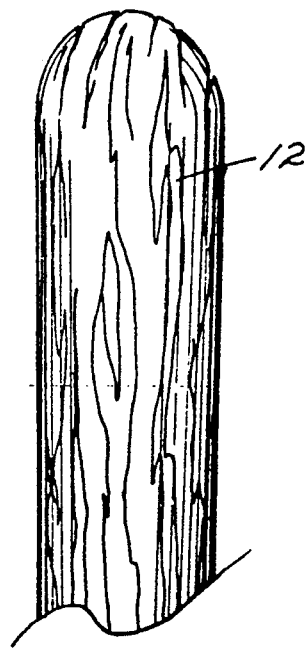
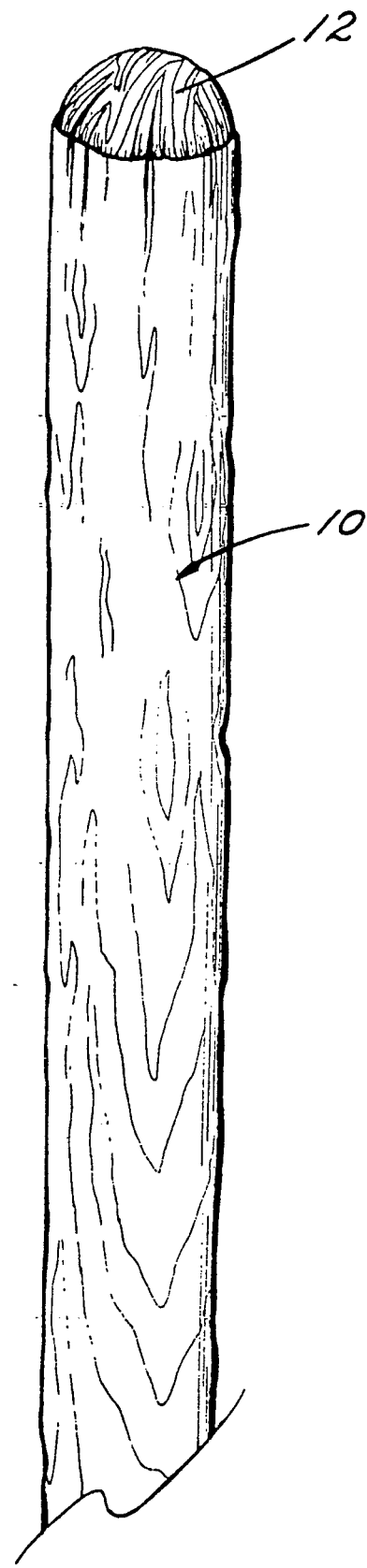
Fig. 1
Fig. 2

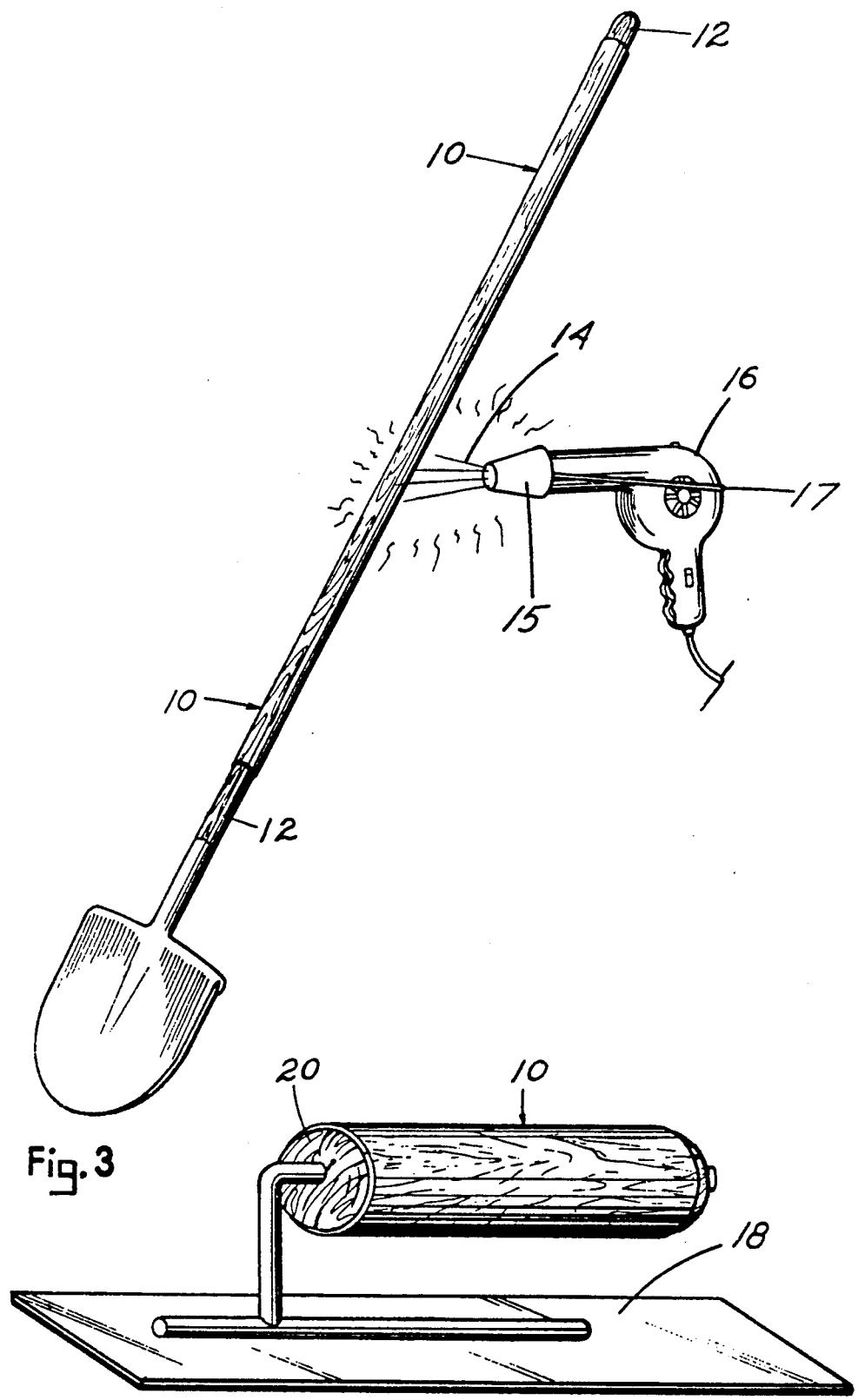

SYSTEM OF RESTORING ROUGH TOOL HANDLES

This is a continuation-in-part of Ser. No. 279,970 filed Dec. 5, 1988, now abandoned.

BACKGROUND OF THE INVENTION

1. Field of the Invention

This invention relates to restorative finishes and coatings for wooden tool handles. More precisely it relates to a system of restoring a smoother yet textured surface to a wooden tool handle made rough by cracking and splintering caused by weathering. The system allows use of common hand-held hair dryers which are normally not adequate for shrinking heat shrinkable tubing used as the restorative coating over the rough tool handle.

2. Description of the Prior Art

An age old problem for the users of hand tools with wooden handles, such as shovels, rakes and the like, has been the occurrence of weathering and damage to the handles of the tools. Age and weathering eventually cause splinters, cracks, bumps and a generally uneven surface to occur on the handles which make gripping of the handle with the bare hands uncomfortable and to cause a high incidence of blisters. Although gloves may be worn by the user of such handles, often the ambient temperature is so high it is uncomfortable to wear them. This is especially true during the summer gardening and farming months.

The early stages of the defects on the handle are generally superficial and do not substantially reduce the structural strength. The handle is still sufficiently strong, and the condition normally does not warrant a new handle from a structural strength standpoint.

One method which is currently in use for providing a new finish to rough wooden handles is the time consuming and messy process of refinishing. Refinishing involves sanding, the filling of cracks, and varnishing. This process is often so time consuming and inconvenient that the user will generally not put out the effort.

Another method to solve the above problem is to replace the old handle with a new handle altogether. Although replacing the old handle may be an ideal solution for some, it is too involved and costly for others since a new handle can often cost as much as the original cost of the entire tool and take a substantial amount of time and skill to install.

Although the use of heat shrinkable tubing on tool handles is taught in U.S. Pat. No. 3,716,433 to Plummer, the disclosure is exclusively concerned with providing a handle protecting jacketing which also provides an enhanced gripping surface. There are currently a great number of rough tool handles which need restoring since much of the damage has already occurred. Also, although Plummer does show his shrink tubing being capable of closely conforming to a factory shaped or contoured handle shaped other than cylindrical or round, he fails to teach how to create a textured gripping surface on once originally smooth cylindrical round handles, the shape of the vast majority of wooden tool handles.

Although the Plummer method of protecting a tool handle through the use of heat shrinkable tubing is similar in nature to my system, Plummer also fails to teach a practical method of heating his heat shrinkable tubing which could be utilized by the average person such as a home owner, house wife, farmer or the like. Most individuals do not own or have available to them a professional high temperature heat air gun or gas fueled flame torch specifically adapted for tasks such as heating devices such as heat shrinkable tubing. The lack of a suitable heating device in the past has been, and currently is a major problem for the majority of individuals who wish use heat shrinkable tubing for one reason or another. If an individual has no means of heating heat shrinkable tubing, the tubing is essentially useless for any purpose.

In view of the alternatives currently available on the market for restoring rough wooden tool handles, I have developed an inexpensive and uncomplicated system which allows most individuals to quickly restore a relatively smooth yet textured non-slip finish to a rough tool handle without having to have a high degree of skill or having to purchase any expensive equipment.

SUMMARY OF THE INVENTION

In practicing my invention I have developed a simple, yet novel system of restoring a rough wooden handle to a smoother yet textured, splinter free gripping surface. Durable and inexpensive, generally smooth-walled, extruded thin-walled heat shrinkable tubing is applied as an outer jacketing over the rough surface of the tool handle. My system is very inexpensive and uncomplicated for the average person to utilize without special skill or equipment. Household scissors, a common hand-held hair dryer and an air concentration nozzle for the hair dryer are normally all the equipment necessary in addition to the specific heat shrinkable tubing to restore a rough wooden tool handle.

The thin, flexible heat shrinkable tubing used with my system closely conforms to the smallest of irregularities formed by the cracks, bumps, and splinters on the rough wooden tool handle during and after heating of the tubing. The thin-walled nature of my tubing is sufficiently thin and pliable even very small defects extend outward through the outer surface of the tubing, not completely through the tubing to puncture it, but to a lesser degree than from the handle itself. It is these extending irregularities which provide the textured, splinter free, non-slip improved gripping surface to the handle. This system will apply a smoother yet textured non-slip surface even to cylindrical round tool handles which have an irregular surface due to age and weathering. The degree of texture will of course depend on severity or roughness of the defects.

Common hand-held hair dryers currently found in most all U.S. households do not discharge adequately concentrated heat to cause heat shrinkable tubing of proper thickness and strength for a handle cover to recover to its smaller diameter. Through the addition of my properly sized and shaped air concentration nozzle, most all common hand-held hair dryers can be temporarily adapted to function well as heat guns for the heat shrinkable tubing used in the system.

Therefore, it is a primary object of my invention to provide a system of restoring a smoother, non-slip, splinter free gripping surface on worn and weathered rough tool handles which is quick, convenient and inexpensive to apply.

A further object of my invention is to provide a system of applying a restorative finish to a rough tool handle which utilizes heat shrinkable tubing over the handle as a covering, and a common hand-held hair dryer adapted with a air concentration nozzle as the means of heating the heat shrinkable tubing.

A still further object of the invention is to provide a system of restoring a smoother, non-slip, splinter free gripping surface on rough tool handles wherein the gripping surface is textured with the texture being provided by the uneven defects of the rough wooden tool handle.

An even further object of my invention is to provide a system of restoring a smoother, yet textured non-slip, splinter free gripping surface on rough tool handles which were originally smooth surfaced and cylindrical in shape but have become rough and irregular with age and weathering.

Other objects and advantages of my invention will become apparent with an examination of the remaining specification with reference to the appended drawings.

BRIEF DESCRIPTION OF THE DRAWINGS

FIG. 1 is a view of one end of a thin walled heat shrinkable tubing in the expanded state positioned above the end of a rough cylindrical shovel handle having an uneven surface caused from cracks and bumps.

FIG. 2 is a side view of the top end of the shovel handle after the heat shrinkable tubing has been slipped over the gripping area of the shovel handle and heated to the recovered diameter of the tubing. Also shown are the irregularities extending through the wall of the thin-walled shrink tubing to provide a textured gripping surface.

FIG. 3 is a view of the heat shrinkable tubing applied to the rough shovel handle. The heating device causing the shrink tubing to recover is a common "gun" style hand-held hair dryer with my air concentration nozzle attached to provide sufficiently concentrated hot air to shrink the tubing.

FIG. 4 is a perspective view of the heat shrinkable tubing applied to the weathered cylindrical handle of a cement trowel. Also shown are the irregularities of the handle surface extending through the wall of the thin-walled shrink tubing.

BEST MODE FOR CARRYING OUT THE INVENTION

Figure 5:
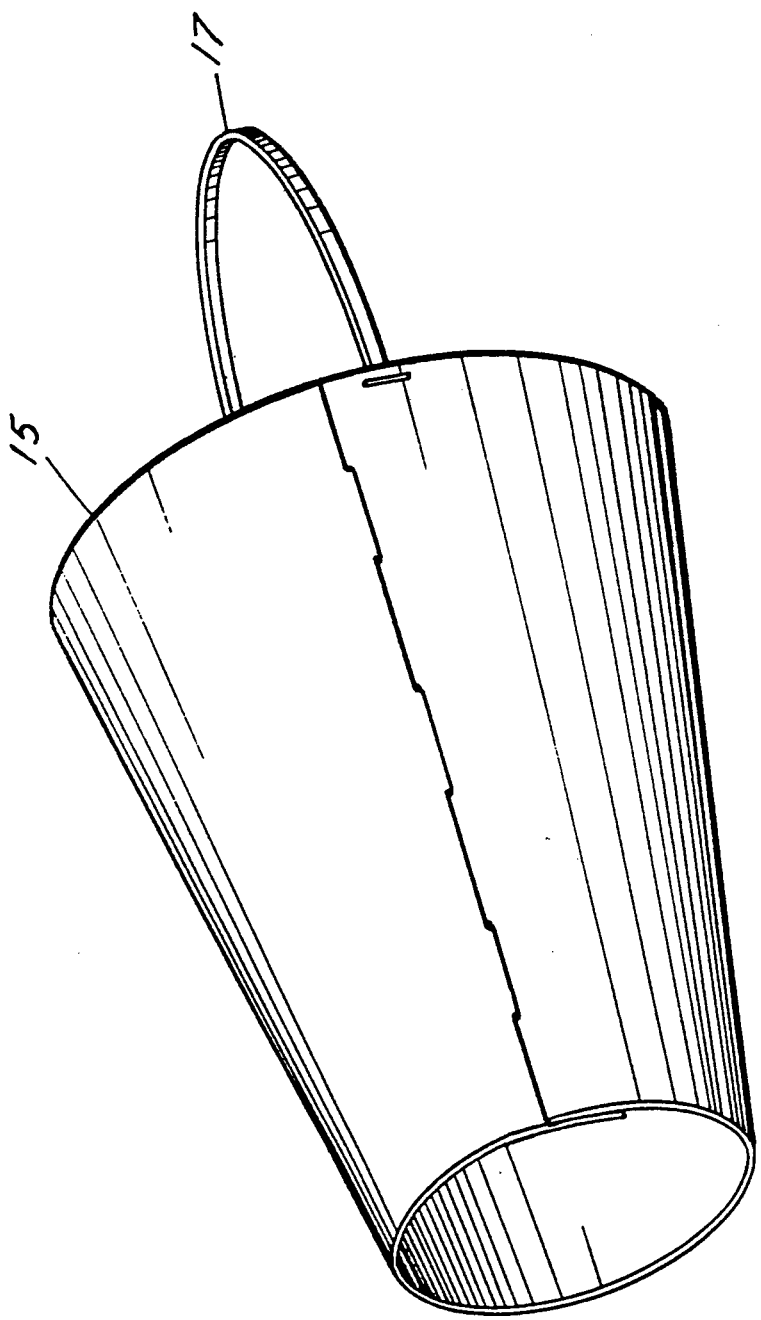
FIG. 5 is an enlarged view of my air concentration nozzle used with the system to adapt a common hand-held hair dryer to supply sufficient heat to cause the heat shrinkable tubing to recover. The air concentration nozzle is specifically sized and shaped to fit most all common hand-held hair dryers.

Referring now to the drawings in general where the various stages and useful equipment of the system of restoring a smoother, non-slip, splinter free gripping surface to rough wooden tool handles are illustrated. In the illustrations, two tools With cylindrical wooden handles are shown as examples of the type of handles for which the restorative system is primarily directed. One of the tools shown is a typical shovel with a cylindrical wooden shovel handle 12. The other tool shown in FIG. 4 is a cement trowel 18 having a wooden trowel handle 20. It will be obvious to those skilled in the art that the restorative system is also applicable to the handles of many other types of tools.

Both handles 12 and 20 as shown are older, weathered handles each having cracks, bumps and a generally uneven surface. Although the surfaces of each of the tool handles has irregularities, the handles are still of sufficient structural strength to perform their designed task. However, the generally uneven surfaces of the handles make gripping of the tool with the bare hands uncomfortable and cause a high incidence of blisters.

The first step in the system to restore a more comfortable and safe gripping surface is to select the proper heat shrinkable tubing 10. There are currently a great many types and sizes of heat shrinkable tubing commercially available. However, many of those available are unsuitable for reasons such as wall thickness, pliability, diameter, shrink ratio, and the temperature at which the tubing will recover to a smaller diameter.

The proper tubing 10 useful for this system must be of the thin walled type between 2 and 8 mil thick, desirably 6 mil, and which has a larger expanded inside diameter than the external diameter of the tool handle to allow easy insertion of the handle into tubing 10 as shown in FIG. 1. Tubing 10 must have a shrinkage ratio which allows a recovered inside diameter of less than the outside diameter of the tool handle. Tubing 10 must also be of the type being sufficiently thin and pliable during the heating stage of the system to substantially conform to the outer shape of the rough wooden tool handle and allow the roughness of the handle to extend upward into the tubing causing a texture through the wall of the tubing 10 to provide a non-slip outer surface of the tubing. Although not shown in the drawings, tubing 10 may also be used on the handles of tools which, if tubing 10 were to inadvertently slip off the handle, personal injury could occur. For this reason tubing 10 should have sufficient rigidity once cooled to securely adhere to the tool handle under normal conditions. Tubing 10 must also be of sufficient tensile strength to resist puncturing by small splinters which are usually present on such handles. Desirably, since tools are often exposed to the sun and weather, the tubing 10 should be reasonably stable and resistant to break down by the weather and ultraviolet radiation.

Suitable heat shrinkable tubing 10 is currently available from several U.S. manufacturing companies in both cut to length pieces or in long continuous lengths. Suitable tubing 10 is available in several chemical compositions such as polyolefin, polyvinyl (PVC), and neoprene to name just a few.

After selection of a suitable tubing 10, the tubing is cut with scissors or other suitable means to a proper length. As shown in FIG. 3, the length of the tubing need not cover the entire length of the handle, but need only cover the area where the hands of the user are normally placed during use. After tubing 10 has been cut to the proper length, it is then slipped over the end of the tool handle and positioned in the hand placement area.

As shown in FIG. 3, the next step is to apply heat 14 to tubing 10 in order to cause recovery thereby reducing the internal diameter of tubing 10. The temperature range in which tubing 10 recovers should fall within a temperature range between 180 and 240 degrees fahrenheit. In this temperature range the tubing 10 will be able to be recovered with a common "gun" style household hand-held hair dryer 16 as shown in FIG. 3 if and only if an air concentration nozzle 15 is applied to the hair dryer. By being able to heat the tubing 10 with a readily available household hair dryer 16, almost everybody can easily and conveniently use my system to repair their rough tool handles. Air concentration nozzle 15 as part of my system is a disposable hollow paper cone with an elastic band 17 for attaching the cone to the hair dryer 16. My air concentration nozzle 15 is specifically structured to be able to be sold or given away with the properly selected heat shrinkable tubing 10 to meet the requirements of the system. Air reduction nozzle 15 is adapted to fit the barrels of most, if not all common "gun" style household hand-held hair dryer 16 as shown in FIG. 3. The wide end of the cone is sized larger than the air dispensing barrel of any currently available brand or models of hair dryers 16 that I am aware of in the U.S. The size of the large end of the air reduction nozzle 15 allows it to be slipped over the barrel of the dryer 16, and the taper of the conical shape of nozzle 15 allows the end of the barrel of the dryer 16 to bottom out against the interior sidewalls of the nozzle 15 at some point between the large end and the small end of the nozzle 15. The taper of the conical concentration nozzle 15 allows it to fit universally from one dryer 16 to another. The elastic band 17 is attached to the large end of nozzle 15 and is adapted to be stretched rearward and hooked over the back end of the dryer 16 to maintain the nozzle 15 in position. The open diameter of the narrow end of nozzle 15 is sized smaller than the dispensing barrel of nozzle 15, desirably having an 1⅛" diameter. This diameter has been found to function well with most all common "gun" style household hand-held hair dryers 16 to concentrate the hot air dispensed from the barrel into a smaller more directed area. The concentrated hot air dispensed from most all common "gun" style household hand-held hair dryers 16 tested thus far has been adequate to cause the heat shrinkable tubing 10 of the system to fully recover. This testing was conducted with common "gun" style household hand-held hair dryers 16 which would not cause the tubing 10 to recover without my air concentration nozzle 15.

All common "gun" style household hand-held hair dryers 16 currently sold in the U.S. are manufactured with a high temperature safety limit switch which will switch the dryer 16 off if too much heat is developed within the dryer 16. Since the air concentration nozzle 15 by itself causes a slight increase in the temperature of the dryer 16 by restricting or backing up some of the air, it is important not to create any further restriction to free air flow from the nozzle 15. Therefore nozzle 15 should not be held aimed directly at a tubing 10 when heating, but rather should be held at an approximate 45 degree angle about 2" away from the tubing 10. A 45 degree angle has been found to direct sufficiently concentrated directable heat to cause the tubing 10 to fully recover, and yet does not add sufficient further blockage to cause the high limit switch to open. Again, by being able to heat the tubing 10 with a readily available household hair dryer 16 and my air concentration nozzle 15, almost everybody can easily and conveniently use my system to repair their rough tool handles.

Although I have described my invention in detail, it is to be understood that I may practice variations in the invention in so far as such variations remain within the intended scope of the appended claims.

What I claim as my invention is:

1. A system of restoring a smoother, splinter free gripping surface to a wooden tool handle having become roughened with defects, wherein the defects are utilized to create a textured, non-slip said gripping surface on the tool handle, said system comprising in combination:

utilizing a heat shrinkable tubing of a thin walled nature and having a recovery temperature range between about 180 and 240 degrees fahrenheit;
said heat shrinkable tubing further having a generally larger expanded internal diameter than the external diameter of the tool handle to allow slipping of said tubing over the tool handle;
said heat shrinkable tubing further having a shrinkage ratio and expanded internal diameter allowing a recovered internal diameter of said tubing to less than the external diameter of the tool handle;
said heat shrinkable tubing further being of sufficient length to cover at least a hand placement area of the tool handle;
said heat shrinkable tubing further being of sufficient strength to generally resist puncture by the defects on the tool handle;
said heat shrinkable tubing further being of a sufficient said thin walled nature and of sufficient pliability during heating thereof to conform to the tool handle and the defects thereof;
said heat shrinkable tubing further being of a sufficient rigidity after heating to fixedly adhere to the tool handle;
said system further including inserting the tool handle into said heat shrinkable tubing, placing said heat shrinkable tubing over the hand placement area of the tool handle, heating said heat shrinkable tubing with heat;
said heat being supplied from a common household hand-held hair dryer having a universally fitting auxiliary air concentration nozzle removably attached thereto, said air concentration nozzle being conically shaped having a larger end thereof fitted over an air discharge barrel of said hair dryer, a narrow end of said air concentration nozzle being smaller in diameter than said barrel of said hair dryer, said narrow end of said air concentration nozzle having means to concentrate heat ejected from said barrel of said hair dryer to cause recovery of said heat shrinkable tubing onto the handle;
application of said heat from said hair dryer with attached said air concentration nozzle for a sufficient period of time to reduce said internal diameter of said heat shrinkable tubing to said recovered diameter;
said thin walled nature and pliability providing means to allow said heat shrinkable tubing to conform to the tool handle during said heating as to allow the defects of the tool handle to extend into said heat shrinkable tubing creating said textured non-slip gripping surface on the tool handle in the area of the heat shrinkable tubing.

2. A system according to claim 1 wherein said universally fitting auxiliary air concentration nozzle removably attached over said barrel of said hair dryer is made of paper and is removably retained over said barrel by an elastic band attached to said air concentration nozzle and hooked over a back end of said hair dryer.

3. A system of restoring a smoother, splinter free gripping surface to a tool handle having become roughened with defects, wherein the defects are utilized to create a textured, non-slip said gripping surface on the tool handle, said system comprising in combination:

utilizing a heat shrinkable tubing of a thin walled nature;
said heat shrinkable tubing further having a generally larger expanded internal diameter than the external diameter of the tool handle to allow slipping of said tubing over the tool handle;

said heat shrinkable tubing further having a shrinkage ratio and expanded internal diameter allowing a recovered internal diameter of said tubing to less than the external diameter of the tool handle;

said heat shrinkable tubing further being of sufficient length to cover at least a hand placement area of the tool handle;

said heat shrinkable tubing further being a sufficient strength to generally resist puncture by the defects on the tool handle;

said heat shrinkable tubing further being of a sufficient said thin walled nature and of sufficient pliability during heating thereof to conform to the tool handle and the defects thereof;

said heat shrinkable tubing further being of a sufficient rigidity after heating to fixedly adhere to the tool handle;

said system further including inserting the tool handle into said heat shrinkable tubing, placing said heat shrinkable tubing over the hand placement area of the tool handle, heating said heat shrinkable tubing with heat;

said heat being supplied from a common household hand-held hair dryer having a universally fitted auxiliary air concentration nozzle removably attached thereto, said air concentration nozzle being conically shaped having a larger end thereof fitted over an air discharge barrel of said hair dryer, a narrow end of said air concentration nozzle being smaller in diameter than said barrel of said hair dryer, said narrow end of said air concentration nozzle having means to concentrate heat ejected from said barrel of said hair dryer to cause recovery of said heat shrinkable tubing onto the handle;

application of said heat from said hair dryer with attached said air concentration nozzle for a sufficient period of time to reduce said internal diameter of said heat shrinkable tubing to said recovered diameter;

said thin walled nature and pliability providing means to allow said heat shrinkable tubing to conform to the tool handle during said heating as to allow the defects of the tool handle to extend into said heat shrinkable tubing creating said textured non-slip gripping surface on the tool handle in the area of the heat shrinkable tubing.

4. A system according to claim 3 wherein said universally fitting auxiliary air concentration nozzle removably attached over said barrel of said hair dryer is made of paper and is removably retained over said barrel by an elastic band attached to said air concentration nozzle and hooked over a back end of said hair dryer.

5. A system according to claim 3 wherein said heat shrinkable tubing recovers in a temperature range between about 180 and 240 degrees fahrenheit.

6. A system of covering at least a portion of a tool handle, said system comprising in combination:

utilizing a heat shrinkable tubing of a thin walled nature;

said heat shrinkable tubing further having a generally larger expanded internal diameter than the external diameter of the tool handle to allow slipping of said tubing over the tool handle;

said heat shrinkable tubing further having a shrinkage ratio and expanded internal diameter allowing a recovered internal diameter of said tubing to less than the external diameter of the tool handle;

said heat shrinkable tubing further being of sufficient length to cover at least a hand placement area of the tool handle;

said heat shrinkable tubing further being of a sufficient said thin walled nature and of sufficient pliability during heating thereof to conform to the tool handle;

said heat shrinkable tubing further being of a sufficient rigidity after heating to fixedly adhere to the tool handle;

said system further including inserting the tool handle into said heat shrinkable tubing, placing said heat shrinkable tubing over the hand placement area of the tool handle, heating said heat shrinkable tubing with heat;

said heat being supplied from a common household hand-held hair dryer, having a universally fitting auxiliary air concentration nozzle removably attached thereto, said air concentration nozzle being conically shaped having a larger end thereof fitted over an air discharge barrel of said hair dryer, a narrow end of said air concentration nozzle being smaller in diameter than said barrel of said hair dryer, said narrow end of said air concentration nozzle having means to concentrate heat ejected from said barrel of said hair dryer to cause recovery of said heat shrinkable tubing onto the tool handle;

application of said heat from said hair dryer with attached said air concentration nozzle for a sufficient period of time to reduce said internal diameter of said heat shrinkable tubing to said recovered diameter.

7. A system according to claim 6 wherein said universally fitting auxiliary air concentration nozzle removably attached over said barrel of said hair dryer is made of paper and is removably retained over said barrel by an elastic band attached to said air concentration nozzle and hooked over a back end of said hair dryer.

8. A system according to claim 6 wherein said heat shrinkable tubing recovers in a temperature range between about 180 and 240 degrees fahrenheit.

* * * * *